(12) United States Patent
Munn et al.

(10) Patent No.: US 11,381,568 B2
(45) Date of Patent: Jul. 5, 2022

(54) SYSTEMS AND METHODS FOR INSPECTION OF THE CONTENTS OF AN APPLICATION PROGRAMING INTERFACE REQUEST

(71) Applicant: Verizon Patent and Licensing Inc., Arlington, VA (US)

(72) Inventors: Jude M. Munn, Bay Point, CA (US); Ye Huang, San Ramon, CA (US); Shelly E. Asher, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 16/512,076

(22) Filed: Jul. 15, 2019

(65) Prior Publication Data

US 2021/0021602 A1    Jan. 21, 2021

(51) Int. Cl.
*H04L 9/40* (2022.01)
*H04W 12/08* (2021.01)
*H04L 9/32* (2006.01)
*H04W 12/069* (2021.01)

(52) U.S. Cl.
CPC .......... *H04L 63/102* (2013.01); *H04L 9/3263* (2013.01); *H04L 63/0823* (2013.01); *H04W 12/069* (2021.01); *H04W 12/08* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 10,693,872 B1 * | 6/2020 | Larson | H04L 9/3228 |
| 2011/0239270 A1 * | 9/2011 | Sovio | H04W 4/60 726/1 |

\* cited by examiner

*Primary Examiner* — Brandon Hoffman

(57) ABSTRACT

A device may receive, from a user equipment (UE), authentication data that includes user information associated with a user of the UE. The device may determine whether the user is authorized to make requests to a service. The device may grant access to the user to make requests to the service. The device may receive, from the UE, a request that is intended for the service. The request may relate to an action that is to be performed by the service. The device may determine whether the user has permission to request the action. The device may provide the request to the service. The device may receive, from the service, a response to the request. The device may provide, to the UE, the response.

20 Claims, 6 Drawing Sheets

SYSTEMS AND METHODS FOR INSPECTION OF THE CONTENTS OF AN APPLICATION PROGRAMING INTERFACE REQUEST

BACKGROUND

An application programming interface (API) may facilitate communication between a client application and a server application in a standardized way. For example, a client application may transmit a request to a server application according to an API for communication with the server application, and the server application may process the request and return a response to the client application.

DETAILED DESCRIPTION OF PREFERRED EMBODIMENTS

Figure 1A:
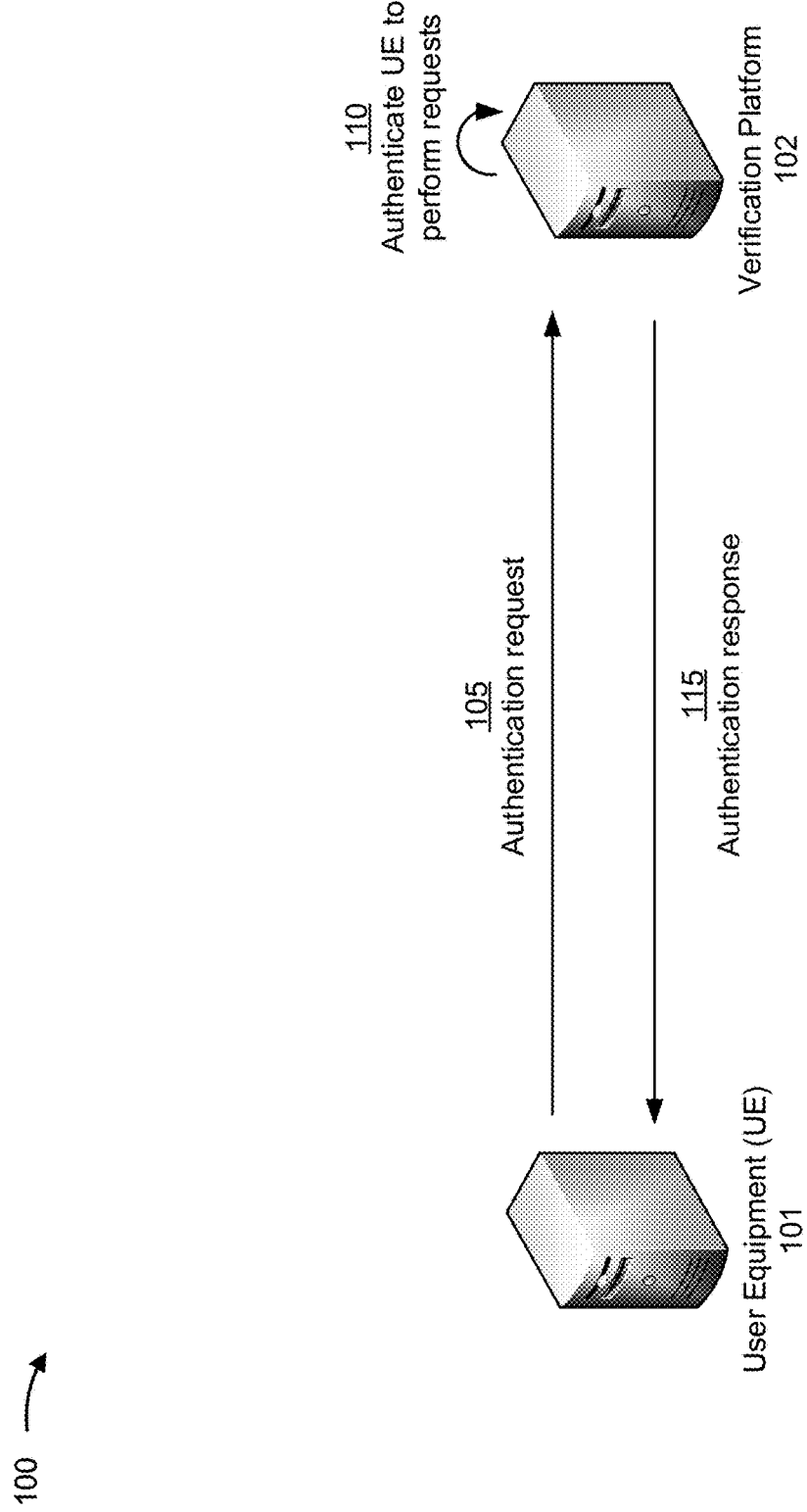
FIGS. 1A-1C are diagrams of one or more example implementations described herein.

The following detailed description of example implementations refers to the accompanying drawings. The same reference numbers in different drawings may identify the same or similar elements.

In some instances, an application executing on a user equipment (UE) may communicate with a service (e.g., a web service) according to an API. For example, the application may transmit a request (e.g., an API request) to the service, requesting the service to perform a particular action. In some cases, the particular action may instruct the service to retrieve, add, modify, delete, and/or the like, data in a database associated with the service. The data involved may be sensitive, intended only for a particular user, critical to a system's functionality, and/or the like. Thus, retrieval, or manipulation, of the data may expose sensitive data, impair a system's functionality, and/or the like. However, current techniques do not inspect a request to a service, prior to the request reaching the service, in order to determine whether an action instructed by the request is a permissible action for a user making the request. Thus, current techniques may allow invalid requests to be received and processed by the service, thereby exposing the service and associated data to security threats, as well as consuming computing resources of the service that could otherwise be used for processing valid requests.

According to some implementations described herein, a verification platform may provide inspection of a request (e.g., an API request), prior to the request being processed by a service (e.g., a web service), to determine whether an action instructed by the request is a permissible action. For example, the verification platform may receive, from a UE, authentication data that includes user information associated with a user of the UE and determine whether the user is authorized to make requests to a service (e.g., according to an API). Based on the authentication data, the verification platform may grant access to the UE to make requests to the service, and thereafter receive, from the UE, a request that is intended for the service. The request may relate to an action that is to be performed by the service. Prior to providing the request to the service, the verification platform may determine whether the user has permission to request the action. If the user is authorized to request the action, the verification platform may provide the request to the service (e.g., to permit the service to perform the action of the request), receive, from the service, a response (e.g., an API response) to the request, and provide the response to the UE.

In this way, the verification platform provides inspection of the contents of the API request prior to the request reaching the service. Accordingly, API requests that are improperly formed, that are unauthorized, and/or the like may be discarded by the verification platform without being forwarded to the service. As a result, the verification platform facilitates a reduction in, or an elimination of, API requests that contain errors, that request unauthorized actions, that contain malicious code, and/or the like that are processed by the service. By reducing the service's processing of invalid requests, the verification platform improves the efficiency of the service, and conserves computing resources that may otherwise be wasted processing invalid requests. Moreover, by reducing the web service's processing of invalid requests, the verification platform improves the security and stability of the service and associated data.

Figure 1B:
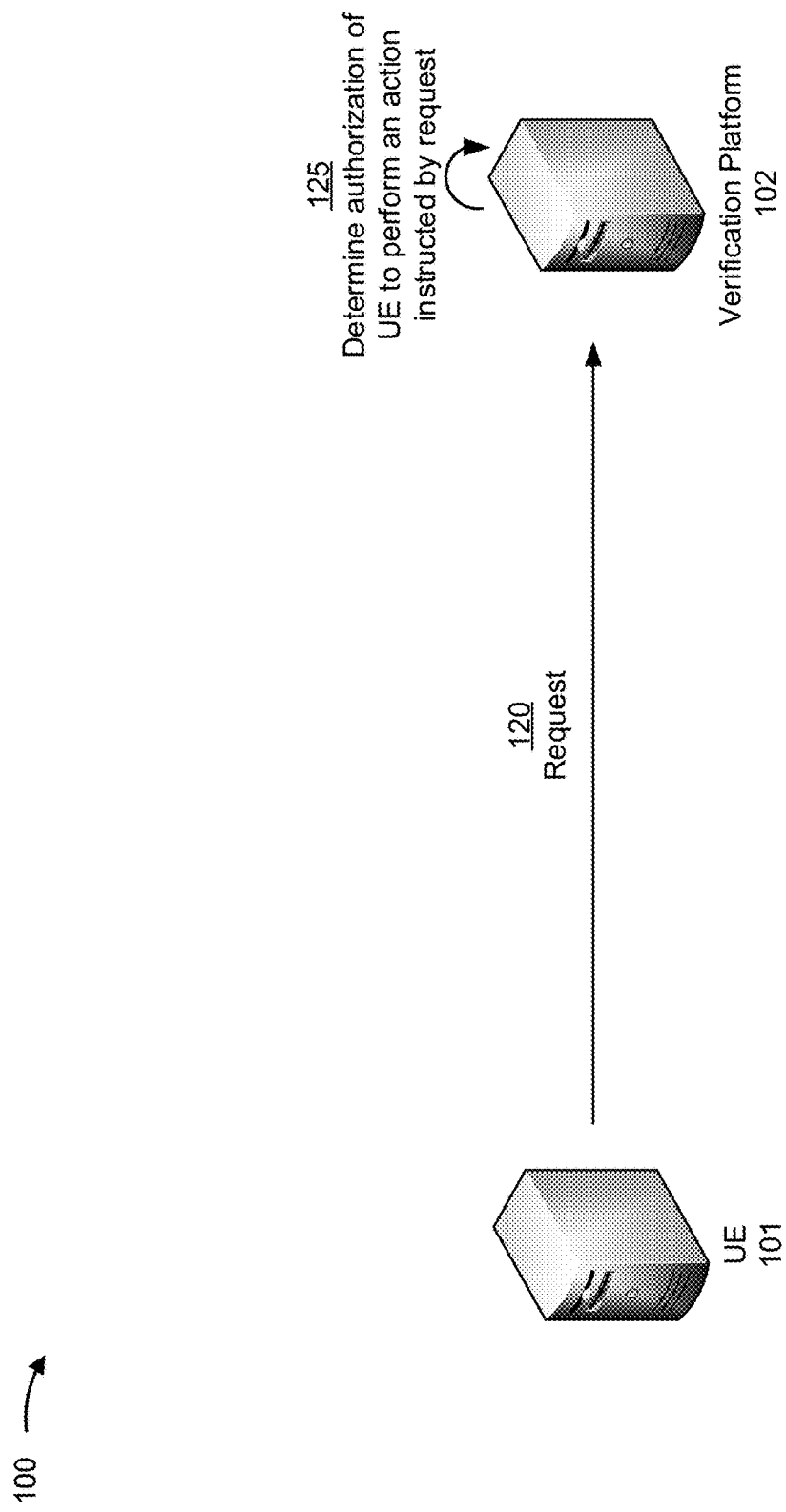
Figure 1C:
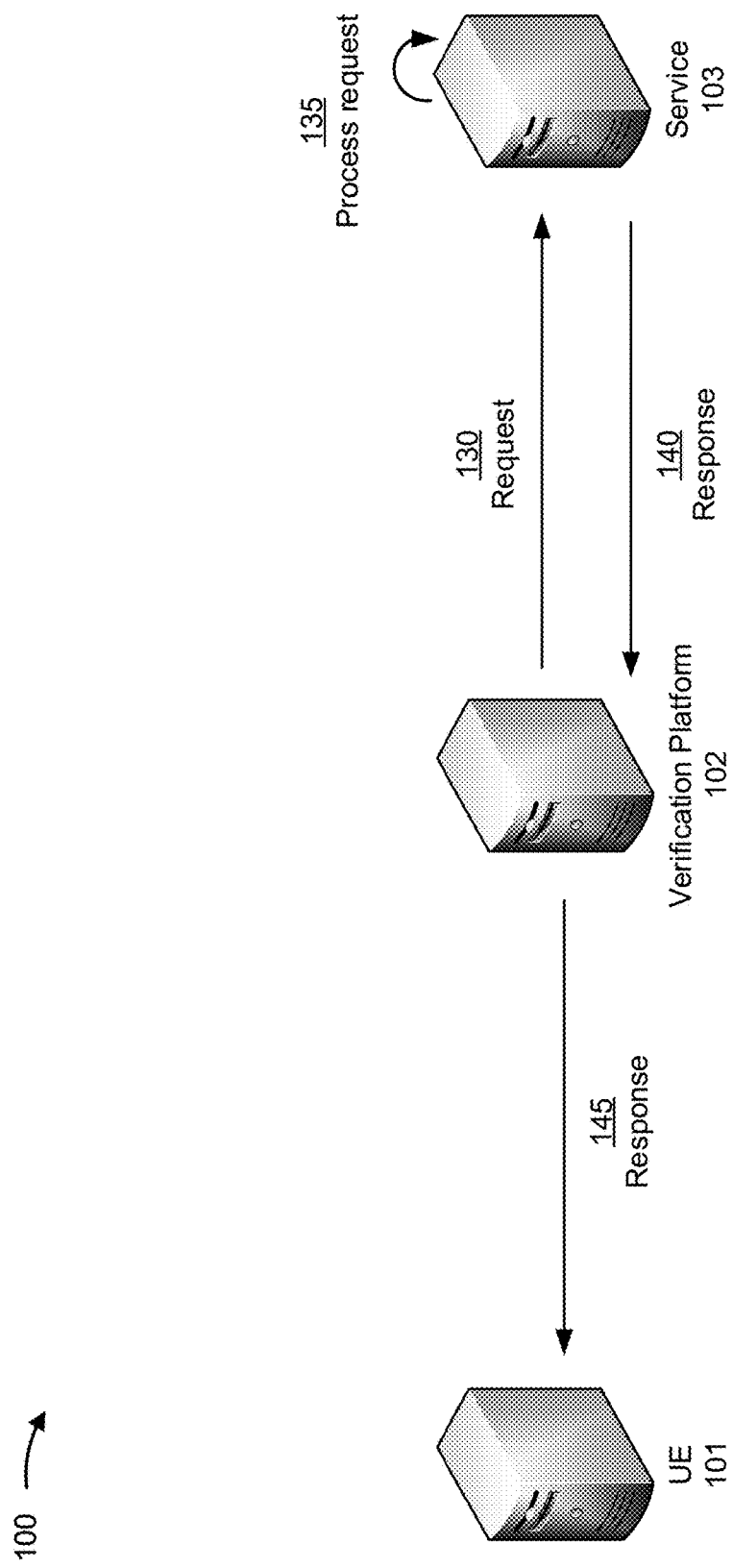

FIGS. 1A-1C are diagrams of one or more example implementations 100 described herein. As shown in FIGS. 1A-1C, example implementation(s) 100 may include a UE 101, a verification platform 102, and a service 103 (depicted in FIG. 1C).

UE 101 may be a mobile device, a smart phone, an internet of things (IoT) device, a wearable communications device, and/or the like. Additionally, UE 101 may be a smart device, such as an Internet-enabled parking meter, an Internet-enabled electronic billboard, an Internet-enabled video camera, an Internet-enabled tracking device, and/or the like. UE 101 may communicate with a data network (e.g., the Internet) via a network, such as a cellular network (e.g., a 5G network). In some cases, UE 101 may be assigned a static Internet Protocol (IP) address when UE 101 is configured with the network. Moreover, UE 101 may be associated with a user. For example, the user may be an entity (e.g., an enterprise) that has access to functions of a core network of the network in order to provision, manage, and/or modify a firewall for one or more UEs associated with the user.

Verification platform 102 may be a computing device, a server, a cloud computing device, and/or the like that processes authentication data, processes requests (e.g., API requests), processes responses (e.g., API responses) to the requests, and/or the like. The verification platform 102 may be associated with a network (e.g., the core network of the network). For example, the verification platform may be a proxy server (e.g., a reverse proxy server, a gateway server, and/or the like) that acts as an intermediary between UE 101 and service 103 (e.g., a web service). Accordingly, requests (e.g., API requests) transmitted by UE 101 and intended for service 103 may be processed by verification platform 102 before being forwarded to service 103.

Service 103 may be a service associated with an API. For example, service 103 may be a web service (e.g., a web service provided by the network), a core network service, and/or the like, that is exposed according to an API. Service 103 may be implemented by a server, such as a server associated with the core network of the network. Service 103 may permit UE 101 to access and/or modify data associated with the network (e.g., associated with the core network).

For example, service 103 may permit UE 101 to provision, manage, and/or modify a firewall for one or more UE associated with the user.

Service 103 may be a web service that permits access to, and/or modification of, data maintained in the core network via one or more API endpoints. The web service may be implemented according to simple object access protocol (SOAP), representational state transfer (REST), and/or the like. Additionally, or alternatively, service 103 may be a service capability exposure function (SCEF), a network exposure function (NEF), and/or the like of the core network. The SCEF or NEF may permit UE 101 to access and/or modify network capabilities, for example, to provision a firewall, associate or disassociate one or more UEs with the firewall, modify settings for the firewall, and/or the like.

While the description to follow will be described in terms of an example of a request intended for a service of a core network, the description is not limited to this particular example. Implementations described herein also apply to any type of request to access and/or modify information that is made from a first device to a second device (e.g., a web server), such as via hypertext transfer protocol (HTTP), via an API, and/or the like.

As shown in FIG. 1A, and by reference number 105, verification platform 102 may obtain an authentication request from UE 101. The authentication request may include authentication data. The authentication data may include user information associated with UE 101 and/or the user. For example, the user information may identify a name of the user (e.g., an enterprise name), an identifier of the user (e.g., an alphanumeric identifier), an identifier of UE 101 (e.g., an alphanumeric identifier, such as an Internet Protocol (IP) address, a Media Access Control (MAC) address, and/or the like).

The authentication data may be a digital certificate (e.g., a public key certificate, such as an X.509 certificate). For example, verification platform 102 may provide a user interface that includes an input element that permits the user to transmit (e.g., via a secure connection) the digital certificate to verification platform 102. In some implementations, the authentication request may comprise a connection request of UE 101 to connect to service 103 (e.g., via a uniform resource locator (URL) associated with a particular endpoint of service 103), and UE 101 may provide a digital certificate as part of the connection request.

The digital certificate may identify the user information. For example, the digital certificate may include a subject distinguished name field that identifies a name of the user (e.g., an enterprise) to which the digital certificate was issued.

Additionally, or alternatively, the authentication data may include a username and password combination, a token, and/or the like. In such a case the username, the token, and/or the like, may be associated with an account of the user that contains user information (e.g., an identifier of the user). In some implementations, the authentication data may include a first authentication factor and a second authentication factor. For example, the first authentication factor may be the digital certificate and the second authentication factor may be a username and password combination, a token (e.g., a token that is messaged to UE 101 after successful authentication of the first authentication factor), and/or the like.

As shown by reference number 110, verification platform 102 may authenticate UE 101 to perform requests (e.g., based on the authentication data). For example, verification platform 102 may determine whether the user is authorized to make requests (e.g., API requests) to service 103. Verification platform 102 may make this determination based on the authentication data obtained from UE 101.

For example, verification platform 102 may inspect the digital certificate obtained from UE 101 (e.g., by terminating a secure connection with UE 101) and obtain user information contained by the digital certificate (e.g., a value contained in a subject distinguished name field of the digital certificate). Verification platform 102 may determine, based on the user information, whether the user is authorized to make requests to service 103 (e.g., based on whether the user is included in a record of authorized users of service 103). In some cases, verification platform 102 may determine, based on the user information, whether the user is authorized to make requests to a particular endpoint of service 103. To do so, verification platform 102 may maintain, or have access to, a data structure (e.g., a database, a linked list, a table, and/or the like) that contains information relating to authorized users of service 103 and/or authorized users of particular endpoints of service 103.

In some implementations, verification platform 102 may determine whether UE 101 is authorized to make requests (e.g., API requests) to service 103. For example, when the user information includes an identifier of UE 101 (e.g., an IP address), verification platform 102 may determine whether UE 101 is authorized to make requests based on the identifier of UE 101. As an example, verification platform 102 may determine whether an IP address of UE 101 corresponds to an IP address assigned to the user.

As shown by reference number 115, verification platform 102 may provide an authentication response to UE 101. For example, verification platform 102 may determine that the user information corresponds to an authorized user of service 103, and may provide an authentication response to UE 101 indicating that UE 101 is authorized to make requests to service 103. In some cases, the authentication response may comprise verification platform 102's acceptance of a connection request of UE 101 to connect to service 103. Based on determining that the user is authorized to make requests to service 103, verification platform 102 may grant access to UE 101 to make requests to service 103.

In some cases, verification platform 102 may determine that the user information does not correspond to an authorized user of service 103, and may provide an authentication response to UE 101 indicating that UE 101 is not authorized to make requests to service 103. In such cases, verification platform 102 may determine to deny access to UE 101 to make requests to service 103. For example, UE 101 may be denied access to an interface through which requests may be made. As another example, verification platform 102 may reject any requests made by UE 101 after determining to deny access to UE 101.

As shown in FIG. 1B, and by reference number 120, verification platform 102 may obtain a request (e.g., an API request) transmitted by UE 101. For example, verification platform 102 may obtain a request transmitted by UE 101 via a secure connection (e.g., a secure socket layers (SSL) connection, a transport layer security (TLS) connection, and/or the like) established between UE 101 and verification platform 102. The request may instruct one or more actions that are to be performed by service 103. For example, the request may instruct service 103 to provide information associated with an account of the user (e.g., configuration settings associated with the account of the user), modify information associated with the account of the user (e.g., associate or disassociate one or more UEs with the account of the user), provision a firewall for the account of the user, configure a firewall rule for the account of the user, and/or the like.

As shown by reference number 125, verification platform 102 may determine whether the user has permission to instruct the one or more actions of the request. In such a case, verification platform 102 may inspect the request (e.g., a content (i.e., payload) of the request). If the request was transmitted by UE 101 via a secure connection between UE 101 and verification platform 102, verification platform 102 may decrypt the request in order to inspect the request. Verification platform 102 may inspect the request to determine a type of an action that is instructed by the request. The type of the action may be a query type, an add type, a delete type, an update type, a provisioning type, a configuration type, and/or the like.

Verification platform 102 may determine whether the type of the action instructed is a permissible type of action for the user to instruct. Thus, the user may be associated with one or more rules (e.g., a rule set) that define permissible types of actions that may be instructed by the user. For example, a first user may be associated with a first rule set indicating that the first user may instruct service 103 to retrieve information (e.g., a query type of action), add information (e.g., an add type of action), and delete information (e.g., a delete type of action), while a second user may be associated with a second rule indicating that the second user only may instruct service 103 to retrieve information. Accordingly, verification platform 102 may maintain, or have access to, a data structure (e.g., a database, a linked list, a table, and/or the like) that contains information relating to respective rule sets for each user that is authorized to make requests to service 103.

In some implementations, verification platform 102 may determine whether the type of the action instructed is a permissible type of action for UE 101 to instruct. Thus, UE 101 may also be associated with a rule set that defines permissible types of actions that may be instructed by UE 101, and the data structure may also contain information relating to respective rule sets for each UE that is authorized to make requests to service 103.

Verification platform 102 may determine that the user has permission to instruct a particular action when the type of the action is a permissible type of action that may be instructed by the user (e.g., the type of the action is included in a rule set associated with the user). Similarly, verification platform 102 may determine that the user does not have permission to instruct a particular action when the type of the action is not a permissible type of action that may be instructed by the user (e.g., the type of the action is not included in a rule set associated with the user). In this way, verification platform 102 may facilitate role-based access control to service 103, thereby permitting different users to be associated with different levels of access that account for different risk levels, different expertise levels, and/or the like, among the different users.

Verification platform 102 may also determine whether the user has permission to instruct the one or more actions of the request based on an account that would be affected by the one or more actions. For example, verification platform 102 may determine that the user does not have permission to instruct an action when the action would access or modify information of an account that is not associated with the user.

In some implementations, verification platform 102 may determine whether the request is in accordance with one or more operations, parameters, schema, and/or the like designated for the API. For example, verification platform 102 may determine whether the request is in accordance with a web services description language (WSDL) associated with service 103.

As shown in FIG. 1C, and by reference number 130, verification platform 102 may forward the request to service 103. That is, verification platform 102 may forward the request to service 103 based on determining that the user has permission to instruct the one or more actions of the request. In such a case, verification platform 102 may establish a secure connection with service 103, such as by exchanging digital certificates with service 103, and may provide the request to service 103 via the secure connection.

In some cases, verification platform 102 may discard the request, without providing the request to service 103, based on determining that the user does not have permission to instruct the one or more actions of the request. Moreover, verification platform 102 may discard the request, without providing the request to service 103, based on determining that the request is not well-formed (e.g., the request is not in accordance with one or more operations, parameters, schema, and/or the like designated for the API). In some implementations, verification platform 102 may discard the request if UE 101 and/or the user has reached a limit on a quantity of requests that may be made, if the request was made outside of a particular time window during which requests must be made, and/or the like. In this way, verification platform 102 selectively provides requests to service 103, thereby conserving computing resources that may otherwise be wasted by service 103 when processing requests that are invalid.

As shown by reference number 135, service 103 may process the request provided by verification platform 102. If the request was provided to service 103 via a secure connection between verification platform 102 and service 103, service 103 may decrypt the request in order to process the request. Service 103 may process the request according to the one or more actions instructed by the request.

In some cases, service 103 may perform the one or more actions and generate a response relating to the performance of the one or more actions. For example, service 103 may retrieve information, as instructed by the request, and generate a response that includes the retrieved information. As another example, service 103 may add information to an account, as instructed by the request, and generate a response indicating that the information was added to the account. In other cases, service 103 may deny the request. For example, service 103 may deny the request if UE 101 and/or the user has reached a limit on a quantity of requests that may be made, if the request was made outside of a particular time window during which requests must be made, and/or the like. In such cases, service 103 may generate a response indicating that one or more actions of the request were not performed. Service 103 may provide the response (e.g., an API response) to verification platform 102 (e.g., via the secure connection between service 103 and verification platform 102).

As shown by reference number 140, verification platform 102 may obtain the response (e.g., the API response) from service 103. For example, verification platform 102 may obtain the response via the secure connection between service 103 and verification platform 102. Accordingly, verification platform 102 may decrypt the response to identify a content of the response. Moreover, verification platform 102 may inspect and/or manipulate the content of the response. For example, verification platform 102 may inspect the content to determine whether the content of the response is well-formed, may convert the content to a particular format (e.g., JavaScript object notation (JSON), extensible markup language (XML), and/or the like) desired by UE 101, and/or the like.

As shown by reference number 145, verification platform 102 may provide the response to UE 101. For example, verification platform 102 may provide the response to UE 101 via the secure connection between UE 101 and verification platform 102. In some implementations, verification platform 102 may log information relating to the request (e.g., the content of the request, whether the request was discarded, why the request was discarded) and/or the response (e.g., the content of the response, whether the response was well-formed or manipulated, and/or the like).

In this way, verification platform 102 facilitates communication between UE 101 and service 103 with improved security and stability. By inspecting the content of requests transmitted by UE 101, verification platform 102 determines whether the requests are valid before the requests are provided to service 103. Accordingly, verification platform 102 ensures that requests provided to service 103 are valid and unlikely to cause a security concern or originate from a malicious source. In this way, verification platform 102 permits a network to expose various core network functionality to users with improved security, while reducing or eliminating the possibility that destabilizing changes will be made to the functionality.

As indicated above, FIGS. 1A-1C are provided as one or more examples. Other examples may differ from what is described with regard to FIGS. 1A-1C. Moreover, the quantity and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
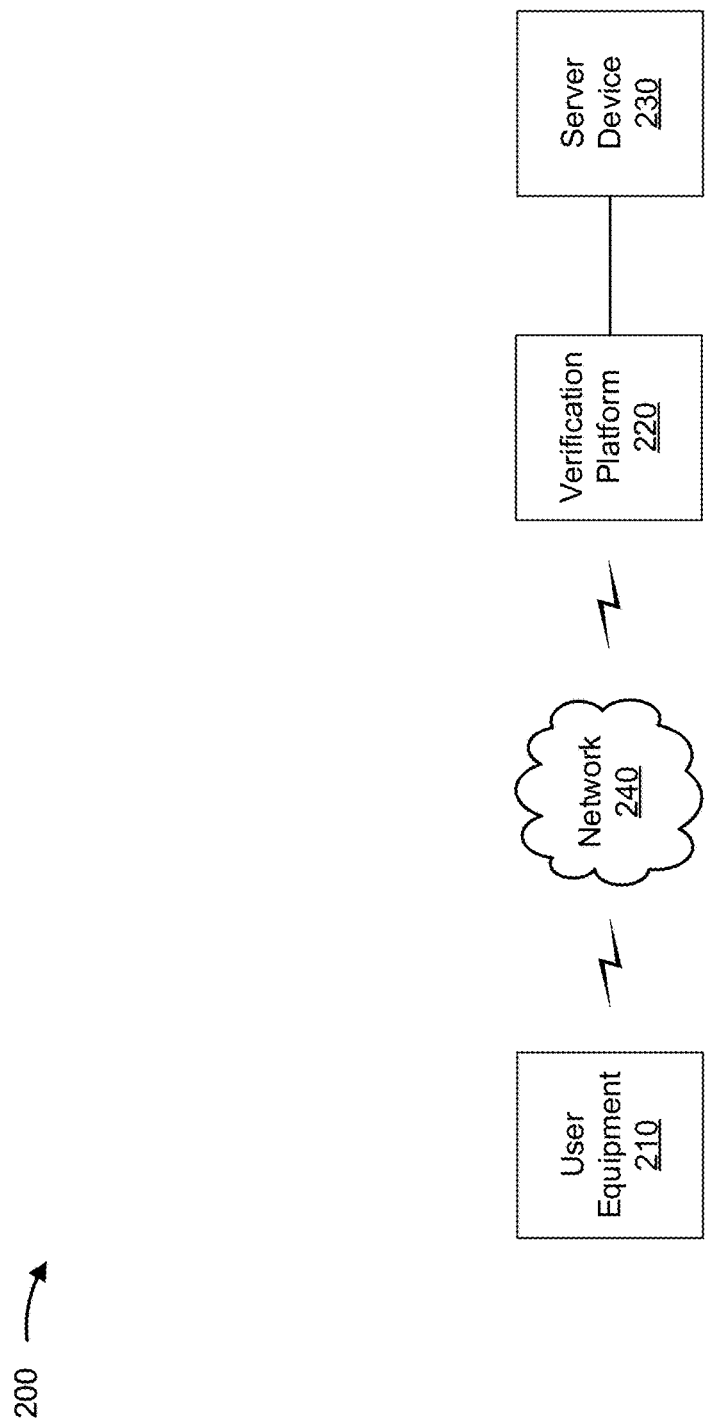
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a UE 210, a verification platform 220, a server device 230, and a network 240. Devices of environment 200 may interconnect via wired connections, wireless connections, or a combination of wired and wireless connections.

UE 210 includes one or more devices capable of receiving, generating, storing, processing, and/or providing information associated with a request (e.g., an API request) that is intended for a service, as described herein. For example, UE 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. UE 210 may perform one or more functions described herein as being performed by UE 101.

Verification platform 220 includes one or more devices capable of storing, processing, and/or routing requests (e.g., API requests) and responses (e.g., API responses), as described herein. Verification platform 220 may be implemented on a single device (e.g., a server device) or a distributed computing system that includes a plurality of devices (e.g., server devices, cloud computing devices, data center devices, and/or the like). Verification platform 220 may be a proxy server (e.g., a reverse proxy server, a gateway server, and/or the like) for a service. Verification platform 220 may perform one or more functions described herein as being performed by verification platform 102. In some implementations, verification platform 220 may implement the service, as described herein.

Server device 230 includes one or more devices capable of storing, processing, and/or routing information associated with requests (e.g., API requests) and responses (e.g., API responses), as described herein. Server device 230 may communicate with verification platform 220 via a wired or wireless connection. Server device 230 may implement a service, as described herein. For example, server device 230 may implement a web service that is accessible according to an API. As another example, server device 230 may be associated with a core network of a network and may implement an SCEF or an NEF accessible according to an API. Server device 230 may perform one or more functions described herein as being performed by service 103.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
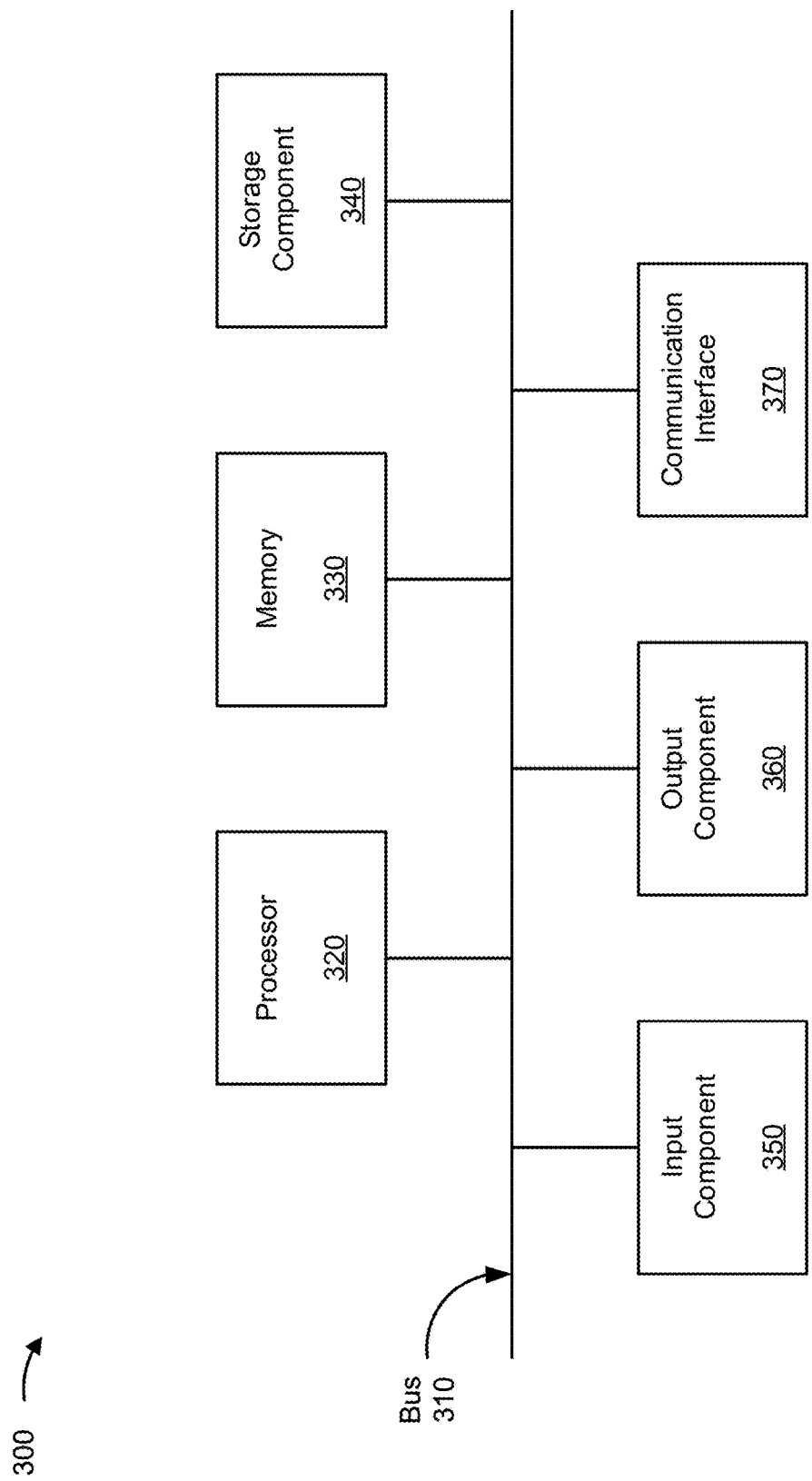
FIG. 3 is a diagram of example components of one or more devices of FIG. 2.

FIG. 3 is a diagram of example components of a device 300. Device 300 may correspond UE 210, verification platform 220, and/or server device 230. In some implementations UE 210, verification platform 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RANI), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The quantity and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
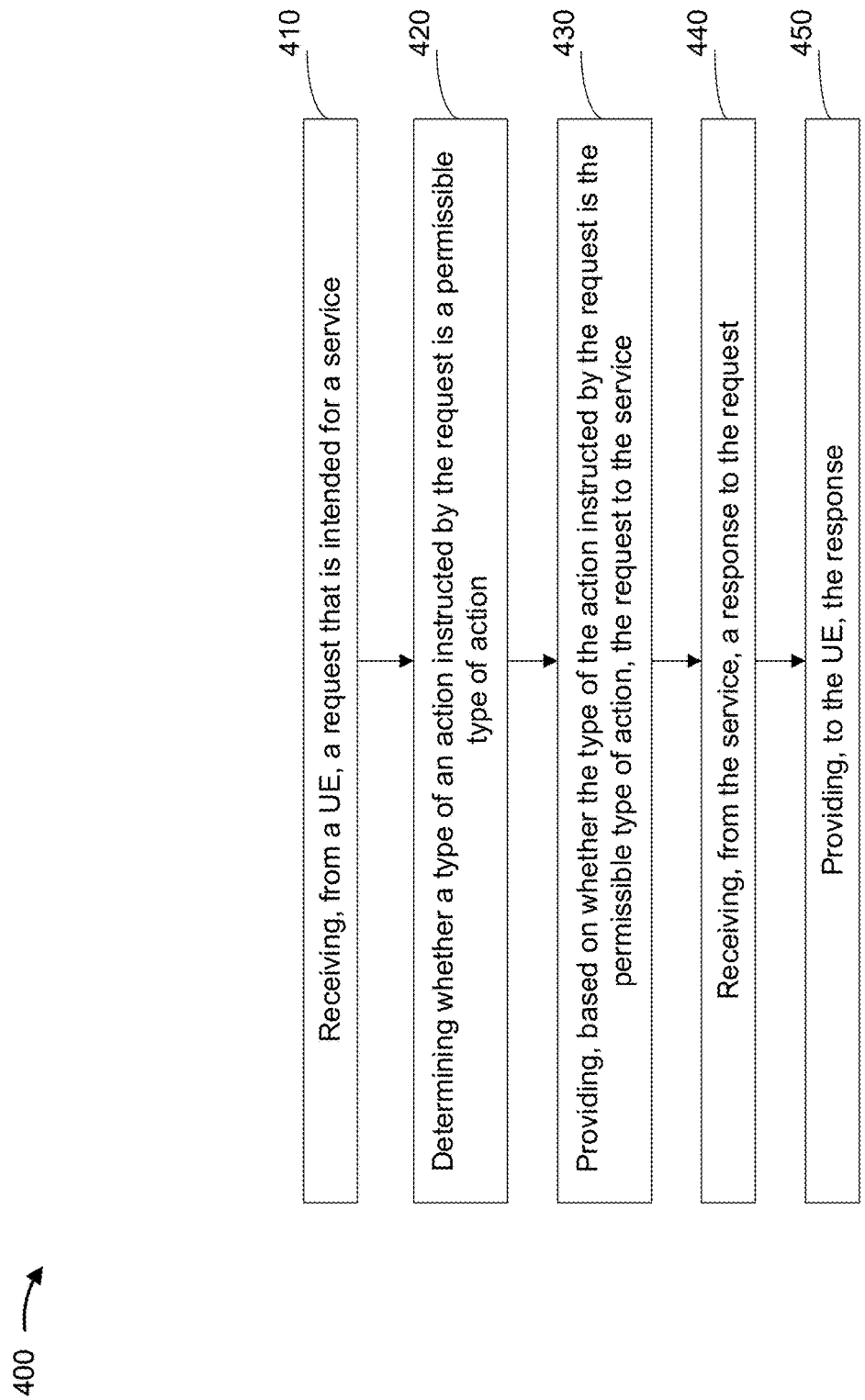
FIG. 4 is a flow chart of an example process for inspection of contents of a request.

FIG. 4 is a flow chart of an example process 400 for inspection of contents of a request. In some implementations, one or more process blocks of FIG. 4 may be performed by a verification platform (e.g., verification platform 220). In some implementations, one or more process blocks of FIG. 4 may be performed by another device or a group of devices separate from or including the verification platform, such as a UE (e.g., UE 210), a server device (e.g., server device 230), and/or the like.

As shown in FIG. 4, process 400 may include receiving, from a UE, a request that is intended for a service (block 410). For example, the verification platform (e.g., using processor 320, memory 330, storage component 340, input component 350, communication interface 370, and/or the like) may receive a request that is intended for a service, as described above. The request may be received from the UE via a first secure connection. The service may be located on a server device that is accessible according to an API. For example, the service may be an SCEF or an NEF of a network.

The UE may be associated with a user and the request may relate to an action that is to be performed by the service. Thus, process 400 may include, prior to receiving the request, determining whether the user is authorized to make requests to the service. For example, process 400 may include receiving authentication data (e.g., a public key certificate) that includes user information associated with the user, and determining whether the user is authorized to make requests to the service based on the authentication data. Determining whether the user is authorized to make requests to the service may be further based on whether an address associated with the UE corresponds to an address assigned to the user. Moreover, process 400 may include granting access to make requests to the service (e.g., based on whether the user is authorized to make requests to the service). However, in some cases, determining whether the user is authorized to make requests to the service may include determining that the user is not authorized to make requests to the service and determining to deny access to the user to make requests to the service.

As further shown in FIG. 4, process 400 may include determining whether a type of an action instructed by the request is a permissible type of action (block 420). For example, the verification platform (e.g., using processor 320, memory 330, storage component 340, and/or the like) may determine whether a type of an action instructed by the request is a permissible type of action, as described above. In other words, the verification platform may determine whether the user has permission to request the action. In some cases, determining whether the user has permission to request the action may include determining that the user does not have permission to request the action and discarding the request prior to providing the request to the service.

In some implementations, the request from the UE may be encrypted when received, and process 400 may include performing decryption of the request in order to determine whether the type of the action instructed by the request is the permissible type of action. Additionally, process 400 may include determining that the request is not formatted for processing by the service, and discarding the request prior to providing the request to the service. For example, process 400 may include determining, before determining whether the type of the action instructed by the request is the permissible type of action, whether the request is in accordance with a WSDL associated with the service.

As further shown in FIG. 4, process 400 may include providing, based on whether the type of the action instructed by the request is the permissible type of action, the request to the service (block 430). For example, the verification platform (e.g., using processor 320, memory 330, storage component 340, output component 360, communication interface 370, and/or the like) may provide the request to the service, as described above. For example, the verification platform may be a reverse proxy server associated with the service. The request may be provided to the service via a second secure connection.

As further shown in FIG. 4, process 400 may include receiving, from the service, a response to the request (block 440). For example, the verification platform (e.g., using processor 320, memory 330, storage component 340, input component 350, communication interface 370, and/or the like) may receive the response to the request, as described above. The response may be received from the service via the second secure connection.

As further shown in FIG. 4, process 400 may include providing, to the UE, the response (block 450). For example, the verification platform (e.g., using processor 320, memory 330, storage component 340, output component 360, communication interface 370, and/or the like) may provide the response, as described above. The response may be provided to the UE via the first secure connection.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a verification device and from a user equipment (UE), authentication data that includes user information associated with a user of the UE;
 determining, by the verification device and based on the user information, whether the user is authorized to make requests to a service by an application programming interface (API);
 granting, by the verification device and based on whether the user is authorized to make the requests to the service, access to the user to make the requests to the service;
 receiving, by the verification device and from the UE, a request that is intended for the service,
  wherein the request relates to an action that is to be performed by the service, and
  wherein the action includes at least one of provisioning or configuring a firewall;

determining, by the verification device and based on the request, whether the user has permission to request the action;
providing, by the verification device and based on whether the user has permission to request the action, the request to the service;
receiving, by the verification device and from the service, a response to the request; and
providing, by the verification device and to the UE, the response.

2. The method of claim 1, wherein the service is located on a server device that is accessible according to the API.

3. The method of claim 1, wherein determining whether the user is authorized to make the requests to the service is further based on whether an address associated with the UE corresponds to an address assigned to the user.

4. The method of claim 1, wherein the UE is a first UE, the user is a first user, and the requests are first requests; and
wherein the method further comprises:
determining that a second user is not authorized to make second requests to the service, and
denying access to the second user to make the second requests to the service.

5. The method of claim 1, wherein
receiving the request is via a first secure connection between the UE and the verification device;
providing the request is via a second secure connection between the service and the verification device;
receiving the response to the request is via the second secure connection; and
providing the response is via the first secure connection.

6. The method of claim 1, wherein determining whether the user has permission to request the action comprises:
determining whether a type of the action of the request corresponds to a permissible type of action associated with the user.

7. The method of claim 1, wherein the request is a first request, and the action is a first action; and
wherein the method further comprises:
receiving, from the UE, a second request that is intended for the service,
wherein the second request relates to a second action that is to be performed by the service,
determining, based on the second request, that the user does not have permission to request the second action, and
discarding the second request.

8. A verification device, comprising:
one or more processors configured to:
receive, from a user equipment (UE), authentication data that includes user information associated with the UE;
determine, based on the user information, whether a user associated with the UE is authorized to make requests to a server;
receive, from the UE, and based on whether the user is authorized to make the requests to the server, a request that is intended for the server,
wherein the request relates to an action that is to be performed by the server, and
wherein the action includes at least one of provisioning or configuring a firewall;
determine whether a type of the action of the request corresponds to a permissible type of action associated with the user;
provide, based on whether the type of action corresponds to the permissible type of action, the request to the server;
receive, from the server, a response to the request; and
provide, to the UE, the response.

9. The verification device of claim 8, wherein the verification device is a reverse proxy server associated with the server.

10. The verification device of claim 8, wherein the request is a first request, and the action is a first action; and
wherein the one or more processors are further to:
receive, from the UE, a second request that is intended for the server,
wherein the second request relates to a second action that is to be performed by the server,
determine that the second request is not formatted for processing by the server, and
discard the request.

11. The verification device of claim 8, wherein the request is a first request, and the action is a first action; and
wherein the one or more processors are further to:
receive, from the UE, a second request that is intended for the server,
wherein the second request relates to a second action that is to be performed by the server,
determine that the user does not have permission to request the second action, and
discard the second request.

12. The verification device of claim 8, wherein the one or more processors, when receiving the request from the UE, are to:
receive the request via a first secure connection between the UE and the verification device; and
wherein the one or more processors, when providing the request to the server, are to:
provide the request to the server via a second secure connection between the verification device and the server;
wherein the one or more processors, when receiving the response to the request, are to:
receive the response to the request via the second secure connection; and
wherein the one or more processors, when providing the response to the UE, are to:
provide the response to the UE via the first secure connection.

13. The verification device of claim 8, wherein the request from the UE is encrypted when received, and
wherein the one or more processors are further to:
perform decryption of the request in order to determine whether the type of the action of the request corresponds to the permissible type of action associated with the user.

14. The verification device of claim 8, wherein the authentication data is a public key certificate.

15. A non-transitory computer-readable medium storing instructions, the instructions comprising:
one or more instructions that, when executed by one or more processors, cause the one or more processors to:
receive, from a user equipment (UE) via a first secure connection, a request that is intended for a service,
wherein the request relates to an action that is to be performed by the service, and
wherein the action includes at least one of provisioning or configuring a firewall;

determine, based on the request, whether a user associated with the UE has permission to request the action;

provide, via a second secure connection and based on whether the user has permission to request the action, the request to the service;

receive, from the service via the second secure connection, a response to the request; and provide, to the UE via the first secure connection, the response.

16. The non-transitory computer-readable medium of claim 15, wherein the one or more instructions, when executed by the one or more processors, further cause the one or more processors to:

determine, before determining whether the user has permission to request the action, whether the request is in accordance with a web services description language associated with the service.

17. The non-transitory computer-readable medium of claim 15, wherein the one or more instructions, that cause the one or more processors to determine whether the user has permission to request the action, cause the one or more processors to:

determine whether a type of the action of the request corresponds to a permissible type of action associated with the user.

18. The non-transitory computer-readable medium of claim 15, wherein the request is a first request, and the action is a first action; and wherein the one or more instructions, when executed by the one or more processors, further cause the one or more processors to:

receive, from the UE, a second request that is intended for the service,
wherein the second request relates to a second action that is to be performed by the service,
determine, based on the second request, that the user does not have permission to request the second action, and
discard the second request.

19. The non-transitory computer-readable medium of claim 15, wherein the service is accessible according to an application programming interface.

20. The non-transitory computer-readable medium of claim 15, wherein the service is a service capability exposure function or a network exposure function of a network.

* * * * *